Nov. 22, 1938.  T. O. HILLBOM  2,137,452
APPARATUS FOR BARKING WOOD
Original Filed April 23, 1936   6 Sheets-Sheet 6
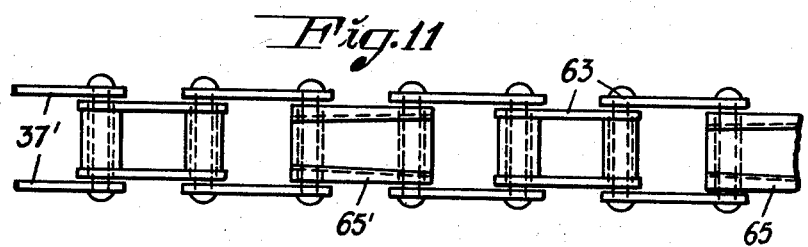
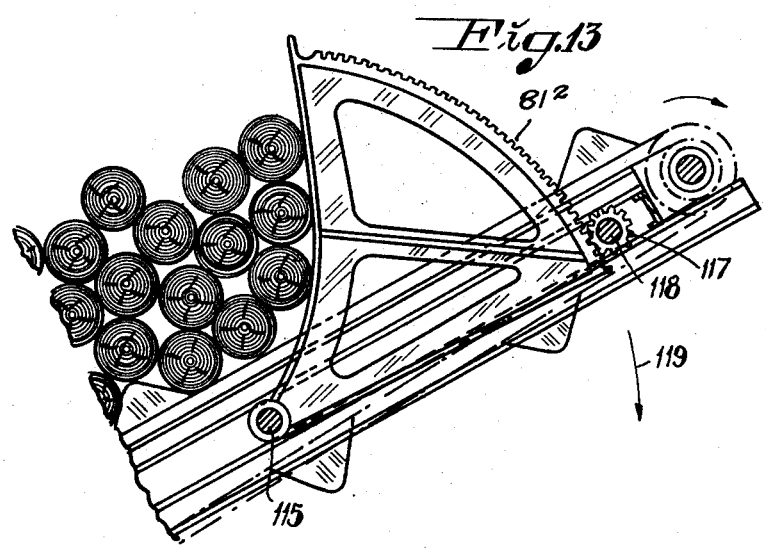

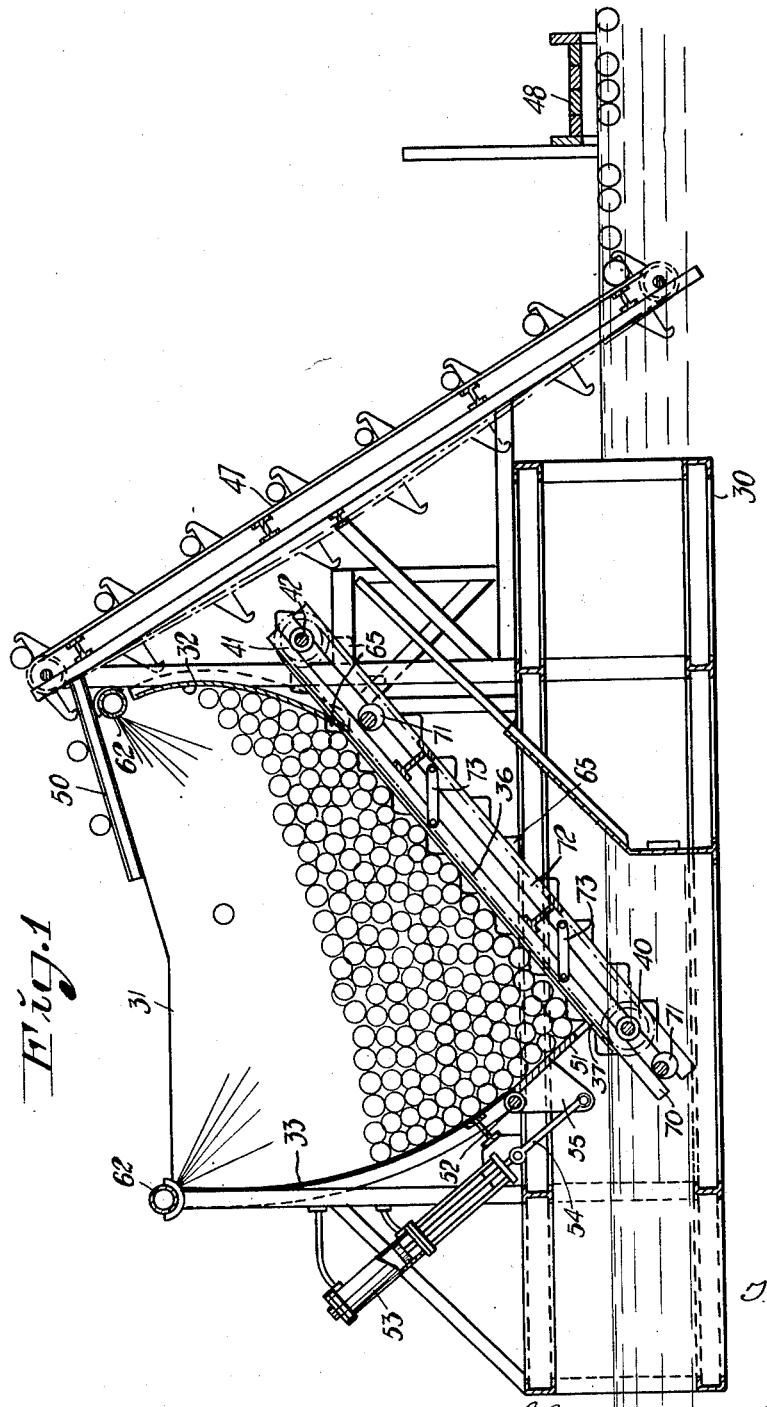

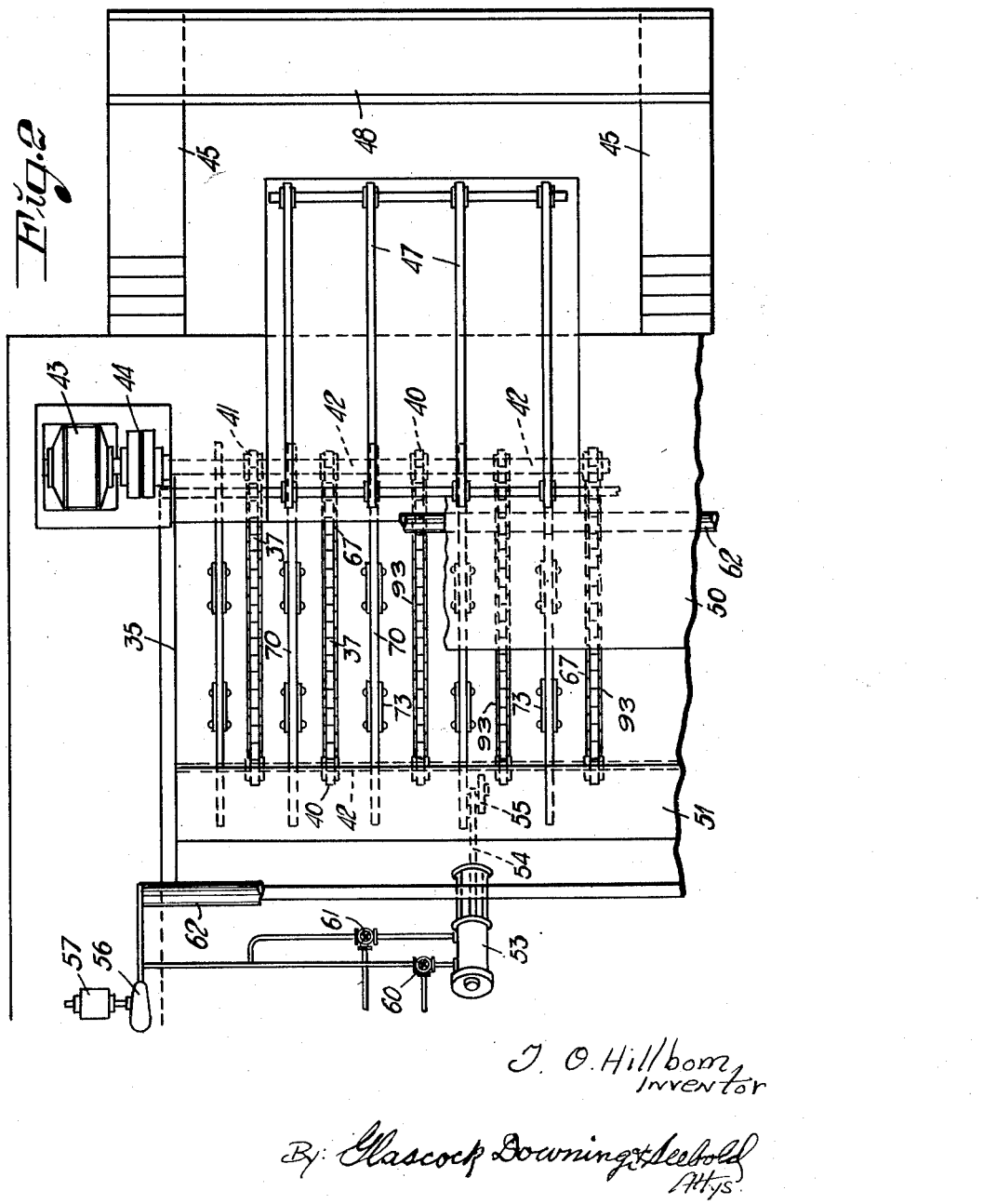

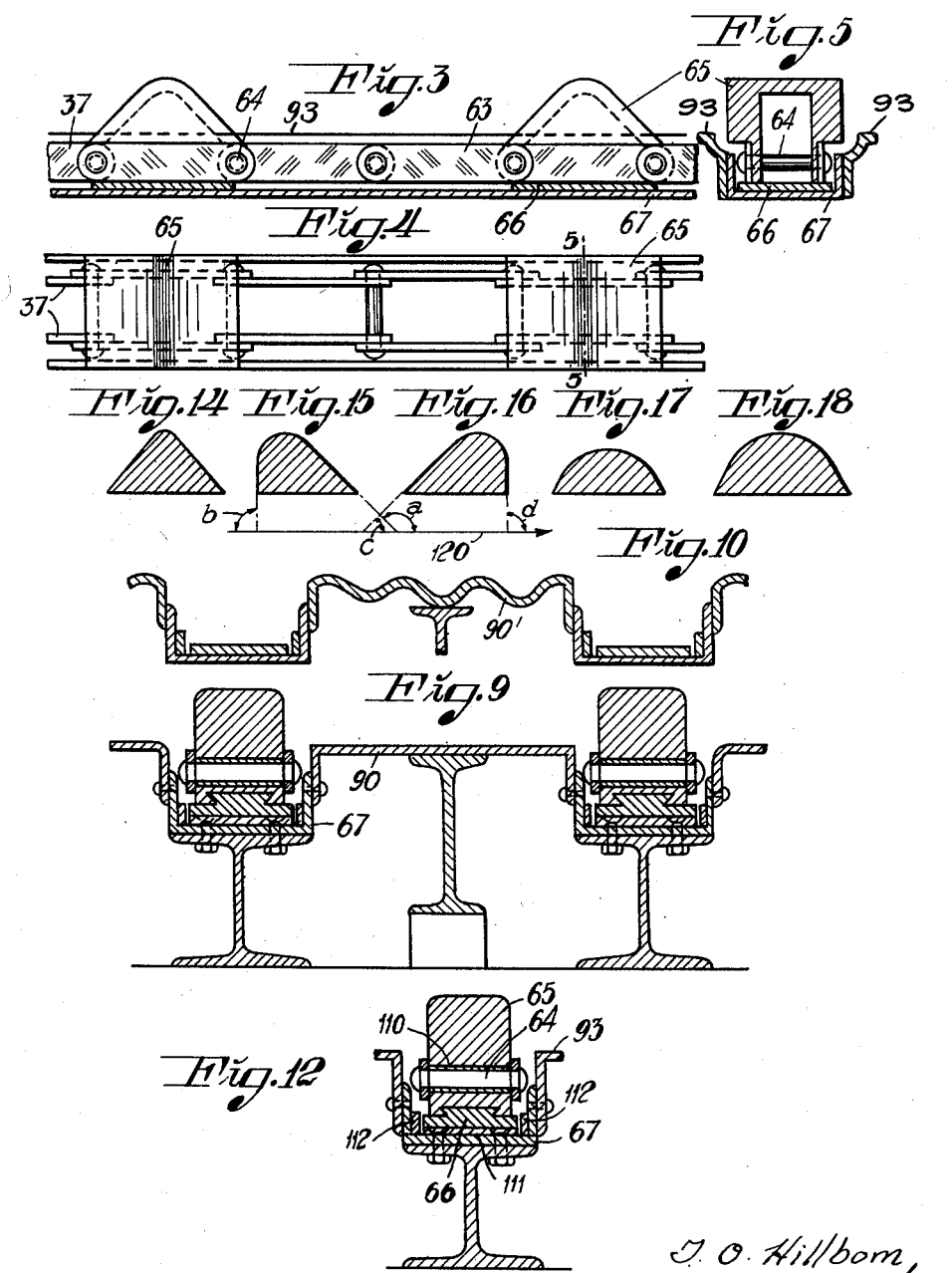

Patented Nov. 22, 1938

2,137,452

UNITED STATES PATENT OFFICE 2,137,452

APPARATUS FOR BARKING WOOD

Tor Ove Hillbom, Karlshall, Lulea, Sweden

Original application April 23, 1936, Serial No. 76,073. Divided and this application April 28, 1937, Serial No. 139,600. In Sweden May 21, 1935

10 Claims. (Cl. 144—208)

This application is a division of my copending application, U. S. Serial No. 76,073, filed April 23rd, 1936.

The most common apparatus for barking wood, such as lumber, logs and the like is the barking drum consisting of a large container in the form of a horizontal cylinder usually submerged in water and rotatable around its longitudinal axis in which during the rotation the logs are fed upwardly along the rising side of the cylinder and then roll back towards the opposite side, the barking being effected substantially by the logs rolling over and striking each other during the last-mentioned movement. In most cases the cylinder is working submerged in water. This known apparatus has an unsatisfactory output depending on the fact that a relative motion between the logs takes place substantially only in the uppermost surface layer of the log pile, where the pressure created by the weight of the logs is small, whereas the lower portions of the log pile perform substantially no motion in relation to the cylinder shell so that the barking action in these portions is insignificant.

In another known apparatus the logs are brought to pass through a plurality of pockets triangular in cross section and having eccentrics at their bottom which intermittently force the lowermost logs upwardly. In this apparatus the pressure created on the logs will be concentrated to only a small portion of the whole number of logs in the pocket, whereas the over-lying portions are only slightly raised and lowered without effecting any considerable revolving movement necessary to effect loosening of the bark. Further there is no guarantee of all or the greater part of the logs reaching the lowermost operative part of the apparatus.

My present invention relates to the barking of wood such as lumber, logs and the like according to the friction method above described and has for its main object to provide a method and an apparatus whereby the logs of the lower layer of the pile are caused effectively to roll against each other without any danger that the logs are damaged by the impellers.

Further objects of my invention will be apparent according as the following description proceeds, reference being had to the accompanying drawings showing by way of example some embodiments of my invention.

In the drawings:—

Fig. 1 is a side view partly in section of a first embodiment of my new apparatus for barking logs, one side wall of the container being omitted to show the interior of the apparatus.

Fig. 2 is a plan view of Fig. 1.

Fig. 3 is a side view and Fig. 4 a plan view of part of a chain on an enlarged scale.

Fig. 5 is a cross-sectional view along the line 5—5 in Fig. 4.

Fig. 6 is a view similar to Fig. 1 of a second embodiment of my invention.

Fig. 9 is a cross-sectional view along the line 9—9 in Fig. 8 on an enlarged scale.

Fig. 10 is a view similar to Fig. 9 showing a modification.

Fig. 11 is a plan view on an enlarged scale of a chain used in this third embodiment.

Fig. 12 is a cross-sectional view along the line 12—12 in Fig. 8 on an enlarged scale.

Fig. 13 shows a modification of this third embodiment on an enlarged scale as compared with Figs. 7 and 8.

Figure 7:
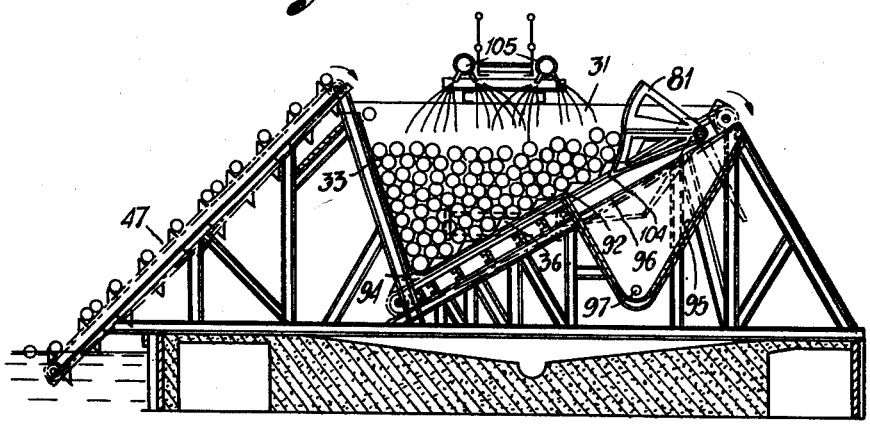
Fig. 7 is a view similar to Figs. 1 and 6 of a third embodiment of my invention.
Figure 8:
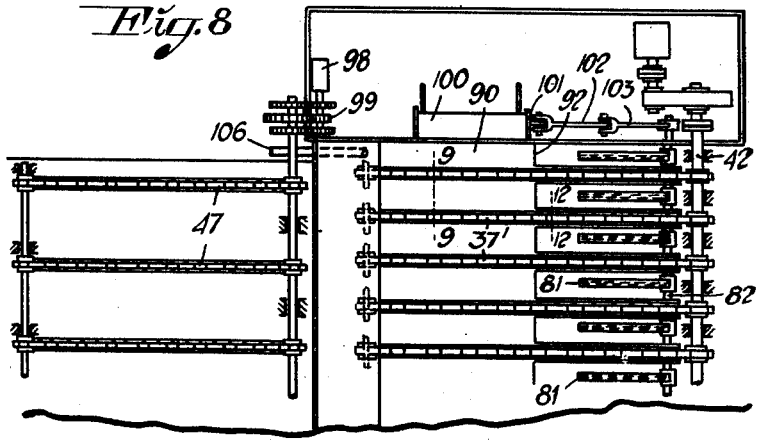
Fig. 8 is a plan view of part of Fig. 7.

Figs. 14 to 18, inclusive, illustrate diagrammatically different embodiments of an impeller in longitudinal sections of the operative portion thereof.

Figures 6, 19:
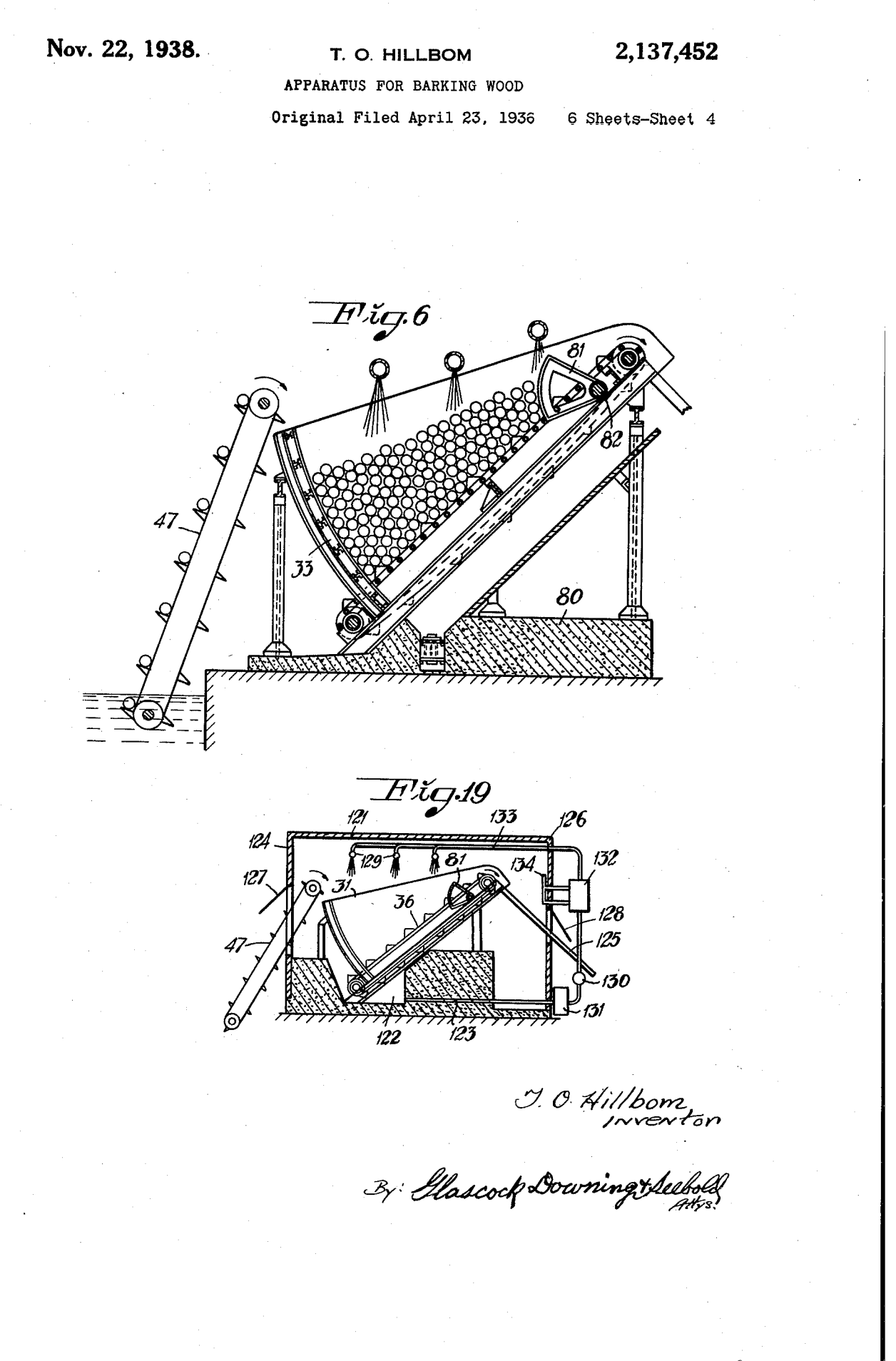

Fig. 19 is a diagrammatical view in longitudinal section of a fourth embodiment of my invention.

With reference to Figs. 1 and 2 reference numeral 30 designates a pontoon on which the barking apparatus according to my invention is mounted. The apparatus comprises a pocket-shaped container 31 open at its top and having a rigid front wall 32, preferably curve-shaped, a rigid rear wall 33 which is also curved, side walls 35, only one of which is shown in Fig. 2, and a bottom 36 extending from the lower edge of the rear wall 33 up to the lower edge of the front wall 32 in inclined relation to the horizontal plane. The bottom 36 comprises a plurality of endless chains 37 arranged in parallel and travelling over lower sprocket wheels 40 and upper sprocket wheels 41. The upper sprocket wheels 41 are secured to a common shaft 42 which is driven by an electric motor 43 (see Fig. 2), preferably via a sliding coupling 44.

The logs are supplied to the container or pocket 31 swimming on the water between two floating bridges 45 by means of chain elevators 47 driven in any suitable manner, e. g. by an electric motor, and fed with logs from a gang-board 48. By the elevators 47 the logs are supplied to an inclined board 50 provided at the top of the apparatus, and from this board 50 the logs fall down into the container 31.

Provided in the rear wall 33 of the container 31 is a shutter 51 for emptying the container, when the barking operation is completed, said shutter 51 being hinged to the rear wall 33 as at 52 and operated by any suitable means. In the embodiment shown the shutter 51 is operated hydraulically by means of a servo piston motor 53, the piston rod 54 of which engages an arm 55 connected to the shutter. As seen in Fig. 2 the pressure medium, e. g. pressure water, is supplied to the servo motor 53 at the one or other side of the piston from a pump 56 driven by an electric motor 57, said supply being controlled by three-way cocks 60 and 61 each controlling inlet and outlet of each side of the piston.

Arranged at the top of the container 31, e. g. along the upper edge of the front and rear walls 32 and 33, are spraying pipes 62 serving to supply water to the container 31 and to the logs therein in order to facilitate the loosening of the bark and the removal thereof from the logs. Water is supplied to said pipes 62 by means of a pump or similar device, e. g. the same pump 56 which serves to operate the servo piston motor 53.

As shown especially in Figs. 3 to 5 inclusive, each chain is composed of links pivotally interconnected by bolts 64. Every second, third, fourth etc., of the links is formed as an impeller 65, preferably of steel projecting into the container, while the other or intermediate links 63 each consist of two lamellae or plates. On the individual double chains 37 said impellers 65 are arranged in line with each other so as to form stairs on the chain bottom 36 (Fig. 1). On their bottom surface the impellers 65 may be provided with a lining 66 of any suitable material, such as pock wood, cast iron, or the like by means of which the impellers 65 slide on the web of a U-beam 67 provided beneath the upper driven side of the endless chains 37. Between the underside of the links 63 and the web of the U-beam 67 there is a free space as shown in Fig. 3. The chains in each embodiment of the apparatus shown are of the kind indicated above. In the embodiment shown in Figs. 1 to 5, 6, 7 to 14, the operative portion of the impellers 65 has in longitudinal vertical section substantially the form of an isosceles-triangle with rounded apex.

Arranged between the U-beams 67 in parallel thereto are bars 70 resting on rollers 71 arranged at the ends of the bars and eccentrically mounted in a rigid beam system 72. These bars serve to support the logs at the spaces between the rows of impellers. The bars 70 are connected to the beam system 72 by means of links 73 in such a manner as to be capable of being raised and lowered by the rotation of the rollers 71, either only at one end or at both ends. By this means the pressure of the log pile may be transferred from the chains 37 onto the bars 70 or vice versa, and further the engagement of the impellers 65 with the logs may be adjusted at will either along the whole length of the chains or only at one end thereof, e. g. in such manner that said engagement is successively decreased towards the upper end of the chains 37.

The operation of this embodiment of the apparatus is as follows. A sufficient number of logs are introduced into the pocket 31 by means of the elevators 47. During the filling of the pocket the bars 70 should, preferably, occupy a position above the plane, in which the tops of the impellers lie in order to spare the chains 37. When the pocket 31 is filled to the desired degree, the elevators 47 are stopped, the bars 70 are lowered by rotating the rollers 71 to such a degree, that the impellers project above the bars. The bars 70 can be lowered below the plane in which the links 63 lie without causing the logs to rest on these links, because the logs in such a case will be supported by the bars 93, which are attached to the U-beams 67, see Figs. 3 and 5. Then water is admitted through the spraying pipes 62 and the motor 43 is started, causing the chains 37 with the impellers to travel from below and upwards to the right in Fig. 1, whereby the logs are caused to perform a circling motion within the pile in the pocket 31 in counter-clockwise direction as seen in Fig. 1, that is the logs are moved upwards along the bottom 36 and the front wall 32 from where they will roll towards the rear wall 33 and down to the bottom 36 again. However, in addition to this circling motion in the log pile as a whole a sort of undulatory motion is imparted to the logs in the lower layer or layers of the log pile causing a rearrangement of the logs in said layer. This is due to the fact that the impellers 65 have such a shape and the chain bottom 36 has such an inclination towards the horizontal plane that the impellers 65 do not immovably carry along the logs of the lower layer but permit said logs during their travel along the chain bottom 36 to roll back over one or more of the stairs formed by the impellers 65, the movement of the logs being braked to a certain degree by the bars 70. In other words, the chains 37 will move at a greater velocity than the logs of the lower layer, so that the impellers 65 will plough themselves through the bottom layer of the log pile, thereby effecting a pulsating motion of the logs in a direction substantially perpendicular to the direction of movement of the chains causing an undulatory motion of the logs of the lower layer which is propagated upwards along the bottom.

The above-said circling motion of the whole log pile but especially the motion of the individual logs of the lower layer in relation to each other as above described will cause strong settings in the log pile on account of the pressure of the over-lying layers, resulting in an effective barking action. The bark thus loosened from the wood will by its own weight and under the action of the streaming water escape from the container 31 through the openings between the chains 37 and the bars 70, the bark falling down directly into the water. Evidently, the bark may also fall down on a conveyor arranged beneath the lowest point of the container. In an apparatus according to my invention in which long logs are treated in parallel arrangement such outlet openings for the bark extending in the direction of movement of the chains involves the advantage of the bark being easily removed from the container due to the fact that the bark pieces have a tendency of adjusting themselves in the direction of movement. Such a rapid removal of the bark from the log pile is, of course, of great importance for attaining a good barking action.

When the barking operation is completed the motor 43 is stopped and the shutter 51 is opened by operating the servo motor 53 causing the logs to leave the container or pocket 31 under the action of their own weight. In order to facilitate the rolling down of the logs and to spare the chains the bars 70 may during the emptying operation occupy their highest position. When the pocket 31 is emptied the shutter 51 is again closed whereupon the operation may be repeated.

In the embodiment of my invention above described the logs are, as shown, fetched up from the water and after barking returned to the water. However, the apparatus may also be situated on land. Such an embodiment is shown in Fig. 6.

According to this figure the barking apparatus is mounted on a basement of concrete 80. As in the previous embodiment the apparatus is filled with logs by the elevators 47 which fetch the logs from the water. The rear wall 33 of the container has no emptying shutter, but the apparatus is adapted to be emptied at the upper end of the chains. For this purpose the rigid front wall of the apparatus shown in the previous embodiment is replaced by a plurality of sector-shaped parts 81 which are arranged laterally of the chains and are rigidly mounted on a common shaft 82 which is rotatably mounted in a frame. In the position shown on the drawings said sectors form a sort of damming-up device preventing the logs from leaving the apparatus and causing them to roll back towards the rear wall 33. When the container 31 is to be emptied, the sectors are swung away downwardly by rotating the shaft 82, thereby permitting free passage of the barked logs over the upper end of the chains 37.

In the previous embodiments the bottom of the container is formed by chains and supporting bars arranged therebetween. In treating logs of widely varying length and diameter there is a risk of wood pieces falling down through the openings between the chains and the bars. This risk is eliminated in the embodiment shown in Figs. 7 to 12, inclusive, by the bars being replaced by longitudinal strips or plates 90 covering the spaces between two adjacent chains 37 and secured to the supporting U-beams 67 thereof as shown in Fig. 9. These plates 90 form a rigid floor for the wood and exerts a certain braking effect against the power exerted by the impellers. According to this figure these strips 90 are plane, but according to Fig. 10 they may be corrugated as shown at 90' resulting in a certain increase of the barking action by the logs striking said corrugations when having passed a row of impellers 65 of the chain system. By these strips the bottom 36 of the container 31 becomes unbroken except the spaces in the double chains.

However, the bottom of the container is not unbroken throughout its whole longitudinal extension but only in its lower part, the strips 90 terminating as at 92 (Fig. 7). In the remaining part of the bottom 36 the logs rest on supporting bars 93 secured to the U-beams 67 as shown in Fig. 12 and extending from point 92 up to the driving shaft 42 of the chains 37.

This unbroken part of the bottom of the container prevents, of course, also bark from falling down through the bottom. Hereby it is possible to place the apparatus relatively near the ground as no conveyor for the bark needs to be provided at the lowest point of the container.

Arranged at the angle between the rear wall and the bottom of the container is a somewhat rounded plate as shown at 94 preventing bark from being collected at said angle. The bark falls down to the bottom of the container and is carried along upwardly by the logs until it reaches point 92 where the intermediate strips 90 terminate. Then the bark is permitted to fall down through the openings between the chains into a pocket 95, e. g. of sheet iron placed beneath the bottom 36 from point 92 and upwards. In order to protect the lower side of the chain against down-falling bark pieces a roof may be provided composed of strips 96 arranged above the lower side of the chains and having a width substantially equal to that of the impellers 65.

At the lowest point of the bark collecting pocket 95 a conveyor (not shown) may be provided to remove the bark, but in most cases it is sufficient to provide a pipe 97 (Fig. 7) in one side wall of the pocket 95 through which pipe water is supplied to wash away the bark through a suitable opening not shown, in the opposite side wall. In this case the bottom of the pocket may be arranged at an angle to the horizontal plane so as to cause the water jet to wash away the bark to the other side of the pocket where it may be freed from water in a strainer (not shown).

With regard to other details the apparatus according to this embodiment is substantially built in the same manner as those previously described. However, instead of being curved as in said embodiments the rear wall 33 of the container is straight whereby the apparatus is simplified. Further the rear wall 33' is shown to be somewhat steeper than in the previous embodiments.

The elevators 47 are shown to be operated by an electric motor 98 connected with a common shaft 99 of sprocket wheels of said elevators.

The sectors 81 serving as damming-up means for the logs during the barking operation are operated hydraulically by means of a servo motor 100 (see Fig. 8) substantially similar to the motor 53 shown in Figs. 1 and 2 for the operation of the shutter 51. The servo motor 100 has inlet and outlet for a pressure medium and its piston rod 101 is by means of a coupling rod 102 connected to an arm 103 rigidly secured to the common shaft 82 of the sectors 81. As shown in Fig. 7 the side of the sectors 81 facing the log pile is curved in such manner as to facilitate the passage of the logs from the chains to the sectors. The sectors 81 may be secured in working position by means of a stop bar 104.

The spraying means comprises spraying pipes 105 suspended above the pocket 31. In addition thereto a spraying pipe 106 may be arranged at the lower corners of the container serving in addition to the above-said curved plate 94 to prevent bark from being collected at this place. It will be obvious that if water is supplied through the pipes 106 at the lower corners of the container this water will wash away bark from these places so that the bark will be caught by the logs and the chains, and moved upwardly with said logs and chains, and finally, be discharged through the bark openings formed by the spaces between the bars 93 at the upper part of the container.

According to the embodiment shown in Figs. 7 to 12 the bolts 64 which pivotally connect the impellers 65 of the chains with the lamellae links 63 are connected to the impellers by means of metal bushings 110 (see Fig. 12), and the bottom lining 66 of the impellers 65 is secured to said impellers by a dove-tail joint. The dove-tail slots in the impellers taper in a direction opposite to the direction of movement of the chains (see Fig. 11) causing the linings to be pressed rigidly into the slots during operation. Plates 111, preferably of steel secured to the upper surface of the U-beams 67 and lateral guiding rods 112 for the impellers serve to prevent tearing of said beams. It may be observed that the chain links 63 are unloaded from the pressure of the log pile by the bottom strips 90 and the supporting bars 93, nor do they bear on the sliding bar 111. It may also be observed that instead of strips 90 covering the whole space between the chains 37' the U-beams 67 of said chains may also in their lower portion only be provided with supporting bars of the same width as bars 93.

According to Fig. 13 the sectors 81² are swingably mounted on a common shaft 115 and their rear edge is formed as a toothed segment 116 meshing with a gear 117 on a shaft 118, which may be coupled to an electric motor (not shown in this figure). When the container 31 is to be emptied the sectors 81² are swung in clockwise direction as shown by the arrow 119.

The longitudinal section of the impellers may vary according to the prevailing working conditions, the nature of the wood, the manner in which the barked material is fed out of the apparatus and so on, it being, however, essential that they have at their top such a rounded shape that the logs on their travel upwardly along the chain bottom are not only partially carried along by the impellers but permitted to roll back over one or more of the impeller rows.

In Figs. 14 to 18, inclusive, I have shown longitudinal sections of different embodiments of impellers.

The embodiment shown in Fig. 14 corresponds essentially to that shown in the previous figures.

According to Fig. 15 the impeller has a front surface which forms an obtuse angle $a$ with the direction of movement of the chains designated by the arrow 120 and a rear surface forming with said direction a less obtuse, e. g. right angle $b$.

According to Fig. 16, the impeller has substantially the same shape as in Fig. 15 but are oppositely directed. Thus their rear surface forms an acute angle $c$ with the direction of movement whereas their front surfaces with said direction forms a less acute, e. g. right angle $d$.

According to Figs. 17 and 18 the impellers have in longitudinal section the form of a sector of a circle or ellipse.

The width of the impellers should be such that the surface thereof bearing on the logs is sufficiently large as not to cause damage of the wood surface. Further, the radius of curvature at the apex of the impeller should not be too small, as otherwise the wood surface may also be damaged.

In Fig. 19 an embodiment according to my invention is shown diagrammatically in which means are provided to subject the logs to a heat treatment during the barking operation. The container 31 is surrounded by a closed casing 121 and partly submerged into a wall 122 in a basement 123, e. g. of concrete. The elevators 47 serving to supply logs to the container projects through an opening in the rear wall 124 of the casing 121, whereas an inclined conveyor 125 for the discharge of the barked logs extends from the upper end of the chain bottom 36 through an opening in the opposite wall 126 of the casing, which openings may during the barking operation be closed by means of suitable shutters 127 and 128, respectively. Warm water is sprayed on the logs in the container 31 through a spraying device 129, and water admixed with bark is sucked by a pump 130 through a separator 131 in which the bark is separated, the water being then pumped into a heating means 132 to raise its temperature from where a pipe 133 conducts the warm water to the spraying device 129. The walls of the casing 121 are, preferably, insulated and, if desired, the interior of the casing may besides by the heat of the circulating warm water, be heated in any suitable manner, e. g. by warm water, steam or warm air. In Fig. 19 I have shown a heating element 134 through which warm heating medium from the heating device 132 may circulate.

This heat treatment may be utilized in a following process of treatment of the wood, as the wood is considerably softened on account of the high temperature which facilitates its treatment in e. g. grinding mills, defibrators, cutting machines or cellulose boilers.

The filling and emptying operations may, if desired, be effected continuously, but the best results ought to be obtained in intermittent working, that is barking a charge of logs, emptying the container, then filling the container with a new charge and so on. In order to improve the cooperation between a barking plant and a following working machine, e. g. a cutting machine, which should work continuously to obtain the best result, it is preferred to use two or more barking apparatus arranged in parallel which apparatus are charged and emptied alternately so as to permit an approximately continuous supply to the following working machine. A further equalization may be effected by the provision after the barking apparatus of a magazine in the form of a water basin enabling a fully continuous operation of the working machine.

When the lengths of the logs vary widely, it is preferred to provide two or more barking machines of different width in parallel, the logs supplied being divided into a corresponding number of groups according to their length whereby an improved barking effect is obtained.

In order to shorten the time necessary for the treatment of the logs in each apparatus and thereby to increase the possibility of a continuous operation in such cases where this is especially desired, it is preferred to arrange two or more barking apparatus in series and to let the logs pass through said apparatus in succession.

What I claim is:—

1. An apparatus for barking wood such as logs and the like, comprising a container in which the logs or the like are adapted to be piled on one another in parallel relation, a plurality of movable members arranged along an inclined path and adapted to move the logs upwardly along said path and to maintain them in their parallel relationship during such movement, impellers arranged on said movable members and movable therewith for imparting a motion to said logs in a direction substantially perpendicular to said inclined path, thereby causing rolling of the logs and rubbing of the same against one another and forcing the logs to circulate within the container, said movable members being spaced from one another and a plurality of log supporting bars arranged between said movable members, said supporting bars being adjustable relatively to said movable members for controlling the engagement of the movable members with the logs.

2. An apparatus as claimed in claim 1, wherein the supporting bars are adjustable substantially parallel with themselves.

3. An apparatus as claimed in claim 1, having means for varying the inclination of said bars with respect to the inclination of said path.

4. An apparatus for barking wood such as logs and the like, comprising a container in which the logs or the like are adapted to be piled on one another in parallel relation, a plurality of chains arranged along an inclined path and adapted to move the logs upwardly within the container and to maintain them in their parallel relationship during such movement, impellers mounted on said chains and movable therewith for imparting a pulsating motion to said logs in a direction substantially perpendicular to the inclined wall, thereby causing rolling of the logs and rubbing of the same against one another and forcing the logs to move in a substantially circular path within the container, said chains being spaced from one another, and a plurality of supporting bars arranged between said chains and parallel therewith, said bars being adjustable in a vertical direction relatively to said chains for controlling the engagement of the chains with the logs.

5. An apparatus for barking wood such as logs and the like, comprising a container in which the logs or the like are adapted to be piled on one another in parallel relation, a plurality of movable members arranged along an inclined path and adapted to move the logs upwardly along said path and to maintain them in their parallel relationship during such movement, impellers arranged on said movable members and movable therewith for imparting a motion to said logs in a direction substantially perpendicular to said inclined path, thereby causing rolling of the logs and rubbing of the same against one another and forcing the logs to circulate within the container, said movable members being spaced from one another, and a plurality of log supporting bars arranged between said movable members, said supporting bars being adjustable vertically with respect to said movable members, adjusting means for raising and lowering the one end of said bars and adjusting means for raising and lowering the other end of said bars.

6. An apparatus for barking wood such as logs and the like, comprising a container in which the logs or the like are adapted to be piled on one another in parallel relation, a plurality of movable members arranged along an inclined path and adapted to move the logs upwardly along said path and to maintain them in their parallel relationship during such movement, a plurality of log supporting bars arranged between said movable members, said supporting bars being adjustable relatively to said movable members for controlling the engagement of the movable members with the logs, the container being provided with a rigid wall terminating at its lower end adjacent said inclined path, said rigid wall having an opening therein, and a movable shutter arranged in said rigid wall for closing said opening, said logs being adapted to be discharged through said opening when the shutter is moved away from said opening.

7. An apparatus for barking wood such as logs and the like, comprising a container in which the logs or the like are adapted to be piled on one another in parallel relation, a plurality of movable members arranged along an inclined path and adapted to move the logs upwardly along said path and to maintain them in their parallel relationship during such movement, said members including impellers arranged thereon and movable therewith for imparting a motion to said logs in a direction substantially perpendicular to said inclined path, thereby causing rolling of the logs and rubbing of the same against one another and forcing the logs to circulate within the container, said movable members being spaced from one another, a plurality of log supporting bars arranged between said movable members, said supporting bars being adjustable relatively to said movable members for controlling the engagement of the movable members with the logs, a rigid wall limiting the movement of the logs downwardly, said wall having an opening at its lower end, a shutter hingedly connected to said wall for closing said opening, damming means arranged at the upper end of said inclined path for blocking the upward movement of said logs and deflecting the logs away from said inclined path.

8. An apparatus as claimed in claim 7, in which a hydraulic piston motor is operatively connected to said shutter for swinging the latter away from said opening and thereby permitting the logs to discharge from said container.

9. An apparatus for barking wood such as logs and the like, comprising a container in which the logs or the like are adapted to be piled on one another in parallel relation, a plurality of movable members arranged along an inclined path and adapted to move the logs upwardly along said path and to maintain them in their parallel relationship during such movement, said members including impellers arranged thereon and movable therewith for imparting a motion to said logs in a direction substantially perpendicular to said inclined path, thereby causing rolling of the logs and rubbing of the same against one another and forcing the logs to circulate within the container, said movable members being spaced from one another, a plurality of log supporting bars arranged between said movable members in an inclined position, said supporting bars being adjustable relatively to said movable members for controlling the engagement of the movable members with the logs, a rigid frame, means for adjusting said bars vertically, said means consisting of two rollers rotatable independently of each other and eccentrically mounted in said frame, the one roller supporting the lower ends of said bars and the other roller supporting the upper ends of said bars.

10. An apparatus for barking wood such as logs and the like, comprising a container in which the logs or the like are adapted to be piled on one another in parallel relation, a plurality of movable members arranged along an inclined path and adapted to move the logs upwardly along said path and to maintain them in their parallel relationship during such movement, said members including impellers arranged thereon and movable therewith for imparting a motion to said logs in a direction substantially perpendicular to said inclined path, thereby causing rolling of the logs and rubbing of the same against one another and forcing the logs to circulate within the container, said movable members being spaced from one another, a plurality of log supporting bars arranged between said movable members and adjustable in a substantially vertical direction with respect to said movable members, a rigid frame, links connecting said rigid frame with the said log supporting bars, and means on said frame for adjusting the supporting bars vertically with respect to said frame.

TOR OVE HILLBOM.